(12) United States Patent
Aramata et al.

(10) Patent No.: US 7,037,581 B2
(45) Date of Patent: May 2, 2006

(54) CONDUCTIVE SILICON COMPOSITE, PREPARATION THEREOF, AND NEGATIVE ELECTRODE MATERIAL FOR NON-AQUEOUS ELECTROLYTE SECONDARY CELL

(75) Inventors: Mikio Aramata, Annaka (JP); Satoru Miyawaki, Annaka (JP); Susumu Ueno, Annaka (JP); Hirofumi Fukuoka, Annaka (JP); Kazuma Momii, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 558 days.

(21) Appl. No.: 10/246,426

(22) Filed: Sep. 19, 2002

(65) Prior Publication Data
US 2003/0215711 A1 Nov. 20, 2003

(30) Foreign Application Priority Data
May 17, 2002 (JP) ............................. 2002-142777

(51) Int. Cl.
*B32B 15/02* (2006.01)
(52) U.S. Cl. .................. 428/402; 428/403; 428/615; 428/620; 428/632; 429/218.1; 429/231.8
(58) Field of Classification Search ............. 429/218.1, 429/231.8; 428/570, 402, 403, 615, 620, 428/632; 423/593, 608, 610, 449.1
See application file for complete search history.

(56) References Cited

U.S. PATENT DOCUMENTS

| 5,395,711 | A | 3/1995 | Tahara et al. |
| 5,478,671 | A | 12/1995 | Idota |
| 6,066,414 | A | 5/2000 | Imoto et al. |
| 6,383,686 | B1 | 5/2002 | Umeno et al. |
| 6,733,922 | B1* | 5/2004 | Matsubara et al. ...... 429/231.8 |
| 2002/0164479 | A1 | 11/2002 | Matsubara et al. |

FOREIGN PATENT DOCUMENTS

| EP | 1024544 A2 | 8/2000 |
| EP | 1032062 | 8/2000 |
| JP | 5-174818 A | 7/1993 |
| JP | 6-60867 A | 3/1994 |
| JP | 10-294112 A | 11/1998 |
| JP | 11-102705 A | 4/1999 |
| JP | 2997741 | 11/1999 |
| JP | 2000-215887 A | 8/2000 |
| JP | 2000-243396 A | 9/2000 |
| JP | 2002-042806 | 2/2002 |
| JP | 2002-42806 A | 2/2002 |
| JP | 2002-260658 | 9/2002 |

\* cited by examiner

*Primary Examiner*—Bruce F. Bell
(74) *Attorney, Agent, or Firm*—Birch, Stewart, Kolasch & Birch, LLP

(57) ABSTRACT

A conductive silicon composite in which particles of the structure that silicon crystallites are dispersed in silicon dioxide are coated on their surfaces with carbon affords satisfactory cycle performance when used as the negative electrode material in a non-aqueous electrolyte secondary cell.

18 Claims, 7 Drawing Sheets

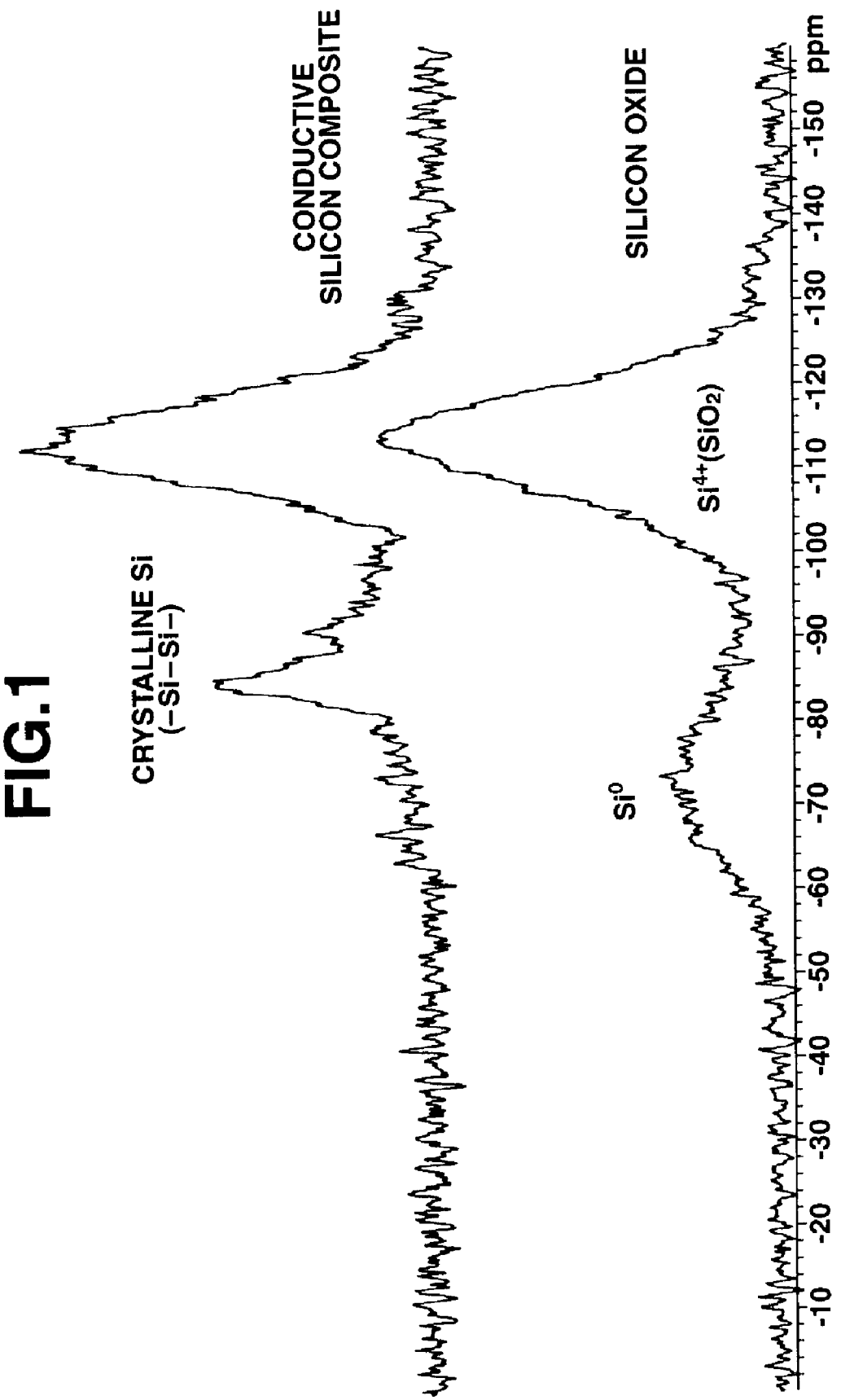

ALIGNMENT OF CARBON ATOMS BEING SEEN

C-Si FUSION

PARTICLE SURFACE PORTION

10nm

APPEARANCE OF PARTICLE

200nm

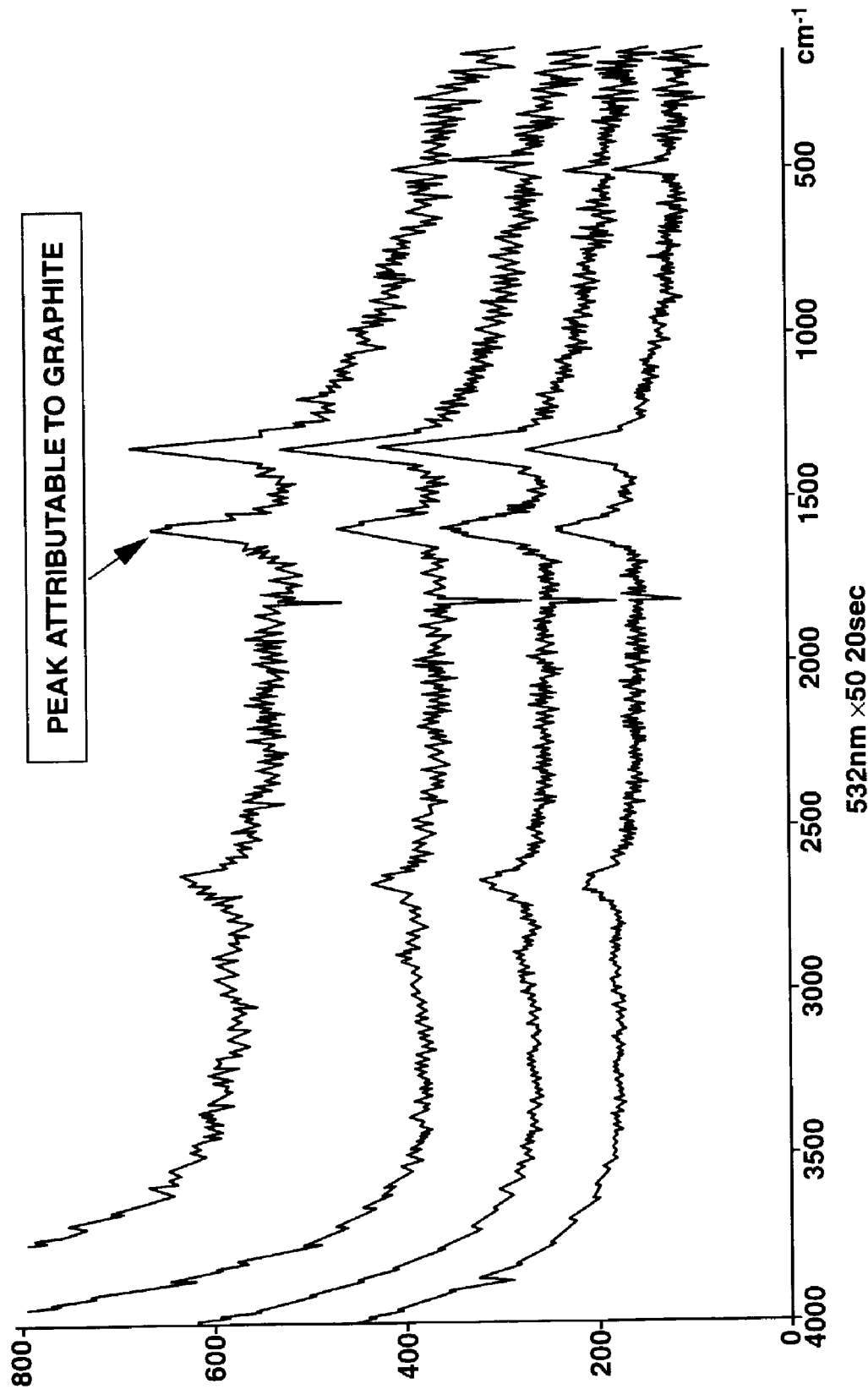

US 7,037,581 B2

CONDUCTIVE SILICON COMPOSITE, PREPARATION THEREOF, AND NEGATIVE ELECTRODE MATERIAL FOR NON-AQUEOUS ELECTROLYTE SECONDARY CELL

This invention relates to a silicon composite powder endowed with electro-conductivity useful as a negative electrode active material in lithium ion secondary cells, a method for preparing the same, and a negative electrode material for use in non-aqueous electrolyte secondary cells.

BACKGROUND OF THE INVENTION

With the recent rapid progress of potable electronic equipment and communication equipment, secondary batteries having a high energy density are strongly desired from the standpoints of economy and size and weight reduction. Prior art known attempts for increasing the capacity of such secondary batteries include the use as the negative electrode material of oxides of V, Si, B, Zr, Sn or the like or compound oxides thereof (JP-A 5-174818, JP-A 6-60867 corresponding to U.S. Pat. No. 5,478,671), melt quenched metal oxides (JP-A 10-294112), silicon oxide (Japanese Patent No. 2,997,741 corresponding to U.S. Pat. No. 5,395,711), and $Si_2N_2O$ or $Ge_2N_2O$ (JP-A 11-102705 corresponding to U.S. Pat. No. 6,066,414). Also, for the purpose of imparting conductivity to the negative electrode material, mechanical alloying of SiO with graphite followed by carbonization (JP-A 2000-243396 corresponding to EP 1,032,062), coating of Si particle surfaces with a carbon layer by chemical vapor deposition (JP-A 2000-215887 corresponding to U.S. Pat. No. 6,383,686), and coating of silicon oxide particle surfaces with a carbon layer by chemical vapor deposition (JP-A 2002-42806) are known.

These prior art methods are successful in increasing the charge/discharge capacity and the energy density of secondary batteries, but fall short of the market demand partially because of unsatisfactory cycle performance. There is a demand for further improvement in energy density.

More particularly, Japanese Patent No. 2,997,741 describes a high capacity electrode using silicon oxide as the negative electrode material in a lithium ion secondary cell. As long as the present inventors have empirically confirmed, the performance of this cell is yet unsatisfactory due to an increased irreversible capacity on the first charge/discharge cycle and a practically unacceptable level of cycle performance. With respect to the technique of imparting conductivity to the negative electrode material, JP-A 2000-243396 provides insufficient conductivity since a uniform carbon coating is not formed due to solid-solid fusion. JP-A 2000-215887 is successful in forming a uniform carbon coating, but the negative electrode material based on silicon experiences extraordinary expansion and contraction upon absorption and desorption of lithium ions and as a result, fails to withstand practical service. At the same time, the cycle performance declines, and the charge/discharge quantity must be limited in order to prevent such decline. In JP-A 2002-42806, an improvement in cycle performance is ascertainable, but the capacity gradually decreases with the repetition of charge/discharge cycles and suddenly drops after a certain number of cycles, because of precipitation of silicon micro-crystals, the under-developed structure of the carbon coating and insufficient fusion of the carbon coating to the substrate. This negative electrode material is yet insufficient for use in secondary batteries.

SUMMARY OF THE INVENTION

An object of the invention is to provide a conductive silicon composite from which a lithium ion secondary cell negative electrode having improved cycle performance can be manufactured, a method for preparing the same, and a negative electrode material for use in non-aqueous electrolyte secondary cells.

The inventor has discovered a conductive silicon composite which is effective as a negative electrode active material for use in a non-aqueous electrolyte secondary cell having improved cycle performance.

As previously described, the development of an electrode material having a high charge/discharge capacity is a great concern, and many engineers have been engaged in research. Under the circumstances, silicon and amorphous silicon oxide (SiOx), because of their high capacity, draw a great attention as the lithium ion secondary cell negative electrode active material. However, since they undergo considerable degradation upon repetition of charge/discharge cycles (that is, poor cycle performance) and have low initial efficiency, most of them have not reached the practical level. Making investigations toward improved cycle performance and initial efficiency from this point of view, the inventor discovered that silicon oxide powder is significantly improved in performance over the prior art by subjecting it to chemical vapor deposition (CVD). There was still a need for further improvements in long-term stability and initial efficiency.

To know the reason why a rapid drop of charge/discharge capacity occurs after a number of charge/discharge cycles when the CVD treated silicon oxide is used as the negative electrode active material in a lithium ion secondary cell, the inventor studied the structure of the CVD treated silicon oxide. It was found that large volume changes occur upon occlusion and release of a large quantity of lithium, and particles are broken thereby. Silicon or a silicon compound originally having a low conductivity undergoes volume expansion by occlusion of lithium, so that the conductivity of the electrode itself lowers. As a result, the current collecting capability lowers to impede movement of lithium ions within the electrode, incurring losses of cycle performance and efficiency.

Based on these findings, the inventor made a study on the structure which not only has a stable surface conductivity, but is also stable against volume changes associated with occlusion and release of lithium. It has been found that by dispersing crystallites or microparticulates of silicon in an inert robust substance, for example, silicon dioxide, and fusing carbon to part or all of their surfaces for imparting conductivity, there is obtained a conductive silicon composite which has overcome the above-discussed problems of lithium ion secondary cell negative electrode active material, and has a stabilized high charge/discharge capacity and significantly improved performance and efficiency of charge/discharge cycles. That is, favorable results are obtained by finely dispersing crystallites and/or microparticulates of silicon in a silicon compound, typically silicon dioxide, and coating the surface of the composite with carbon so that carbon fuses to part or all of the surface.

In a first aspect, the invention provides a conductive silicon composite in which particles of the structure that crystallites of silicon are dispersed in a silicon compound are coated on their surfaces with carbon.

In a preferred embodiment, the particles of the structure that crystallites of silicon are dispersed in silicon dioxide have an average particle size of 0.01 to 30 μm, a BET specific surface area of 0.5 to 20 $m^2/g$, and a carbon coverage of 3 to 70% by weight. Preferably, the crystallites have a size of 1 to 500 nm, the silicon compound is silicon dioxide, and the particle surfaces are at least partially fused to carbon. Also preferably, when analyzed by x-ray diffractometry, a diffraction peak attributable to Si(111) is observed, and the silicon crystallites have a size of 1 to 500 nm as determined from the half width of the diffraction peak by Scherrer method, and the carbon coverage is 5 to 70% by weight of the silicon composite. The conductive silicon composite preferably contains 1 to 35% by weight of zero-valent silicon capable of generating hydrogen gas upon reaction with an alkali hydroxide solution. Further preferably, on Raman spectroscopy, the Raman shift provides a graphite structure-intrinsic spectrum near 1580 cm$^{-1}$.

In a second aspect, the invention provides a method for preparing the conductive silicon composite defined above. One method involves the steps of disproportionating silicon oxide with an organic gas and/or vapor at a temperature of 900 to 1,400° C. and simultaneously effecting chemical vapor deposition. Typically, the silicon oxide is represented by the general formula: SiOx wherein $1 \leq x < 1.6$ and takes the form of particles having an average particle size of 0.01 to 30 μm and a BET specific surface area of 0.1 to 30 m$^2$/g.

Another method involves the step of effecting chemical vapor deposition of a component with an organic gas and/or vapor at a temperature of 800 to 1,400° C., the component being selected from among a silicon composite obtained by previously heat treating silicon oxide in an inert gas atmosphere at 900 to 1,400° C. for disproportionation, a composite obtained by coating silicon microparticulates with silicon dioxide by the sol-gel method, a composite obtained by coagulating silicon fine powder with the aid of finely divided silica and water and sintering, and a product obtained by heating silicon and partial oxide or nitride thereof in an inert gas stream at 800 to 1,400° C.

A further method involves the steps of previously subjecting silicon oxide to chemical vapor deposition with an organic gas and/or vapor at a temperature of 500 to 1,200° C. and heat treating the resulting product in an inert gas atmosphere at 900 to 1,400° C. for disproportionation.

In this case, the reaction is preferably conducted in a reactor selected from a fluidized bed reactor, rotary furnace, vertical moving bed reactor, tunnel furnace, batch furnace and rotary kiln.

In a third aspect, the invention provides a negative electrode material for a non-aqueous electrolyte secondary cell, comprising the conductive silicon composite defined above or a mixture of the conductive silicon composite defined above and 1 to 60% by weight of a conductive agent, the mixture having a total carbon content of 25 to 90% by weight.

BRIEF DESCRIPTION OF THE DRAWINGS

FIG. 1 is a solid-state $^{29}$Si-NMR chart of a starting silicon oxide powder and a conductive silicon composite resulting from thermal CVD in methane gas of the starting silicon oxide powder.

FIG. 4 illustrates Raman spectra of the conductive silicon composite.

DESCRIPTION OF THE PREFERRED EMBODIMENTS

Figure 2A:
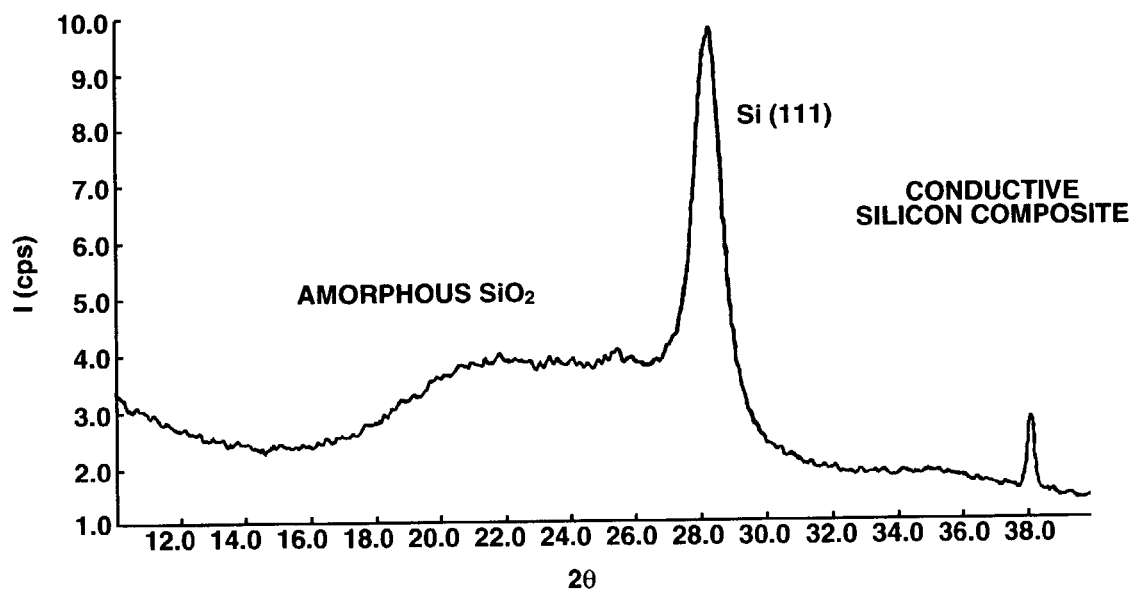
FIGS. 2A and 2B are x-ray diffractometry (Cu—Kα) charts of the starting silicon oxide powder and the conductive silicon composite, respectively.

When used as a negative electrode active material for lithium ion secondary cells, silicon-base materials have a high charge/discharge capacity of several folds over that of graphite-base materials which are the current mainstream negative electrode active material. However, they suffer from a substantial performance drop after repeated charge/discharge cycles. The present invention pertains to a conductive silicon composite which has improved the cycle performance and efficiency of silicon-base materials. The conductive silicon composite of the invention is in the form of particles having the structure that crystallites of silicon are dispersed in a silicon compound, preferably silicon dioxide. Surfaces of the particles are coated with carbon, preferably such that the particle surfaces are at least partially fused to carbon.

By the term "fused" as used herein, it is meant that carbon and silicon coexist between the carbon layer in laminar arrangement and the inner silicon composite, and carbon and silicon are melt-joined together at the interface. The fused state is observable under TEM (see FIG. 3).

Preferably the conductive silicon composite of the invention satisfies the following characteristics.

(i) On analysis by x-ray diffraction (Cu—Kα) using copper as the counter cathode, a diffraction peak attributable to Si(111) is observed as centering near 2θ=28.4°, and the silicon crystallites preferably have a size of 1 to 500 nm, more preferably 2 to 200 nm, especially 2 to 20 nm as determined by Scherrer equation based on the spread of the diffraction peak. Silicon crystallites with a size of less than 1 nm may lead to a lower charge/discharge capacity. With a size in excess of 500 nm, substantial expansion and contraction may occur during charge/discharge cycles, inviting poor cycle performance. It is noted that the size of silicon crystallites is measured using TEM photomicrograph.

(ii) On analysis by solid-state NMR ($^{29}$Si-DDMAS), a broad peak of silicon dioxide centering at approximately −110 ppm and a peak characteristic of Si diamond crystals near −84 ppm appear in the spectrum. It is noted that this spectrum is entirely different from that of ordinary silicon oxide (SiOx wherein x=1.0+α), indicating that the structure itself apparently differs from the latter. It is confirmed by observation under transmission electron microscope (TEM) that silicon crystals are dispersed in amorphous silicon dioxide.

(iii) Zero-valent silicon capable of occlusion and release of lithium ions in a lithium ion secondary cell negative electrode can be determined as a quantity of hydrogen gas generated upon reaction with an alkali hydroxide according to ISO DIS 9286, the method of measuring free silicon in silicon carbide fine powder. The conductive silicon composite contains at least 1%, preferably at least 5%, more preferably at least 10%, even more preferably at least 20% by weight and up to 35%, more preferably up to 30% by weight of zero-valent silicon, as computed from the quantity of hydrogen gas generated. A zero-valent silicon content of less than 1% by weight indicates a less quantity of Li occluding/releasing active material, resulting in a lithium ion secondary cell with a reduced charge/discharge capacity. On the other hand, a zero-valent silicon content of more than 35% by weight may insure a lithium ion secondary cell with a satisfactory charge/discharge capacity, but allow increased expansion and contraction of the electrode during charge/discharge cycles, eventually detracting from cycle performance.

(iv) An observation of a particle surface portion under TEM reveals that carbons are in laminar arrangement which helps enhance conductivity, and inside carbons are in fused state to silicon dioxide, which prevents the carbon layer from separating away and ensures stable conductivity.

(v) On Raman spectroscopy, a spectrum attributable to graphite appears near 1580 $cm^{-1}$, indicating that part or all of the carbon has the graphite structure.

The conductive silicon composite powder of the invention preferably has an average particle size of at least 0.01 µm, more preferably at least 0.1 µm, even more preferably at least 0.2 µm, most preferably at least 0.3 µm, and up to 30 µm, more preferably up to 20 µm, even more preferably up to 10 µm. Too small an average particle size may lead to too low a bulk density and hence, a lowering of charge/discharge capacity per unit volume. On the other hand, too large an average particle size may make it difficult to prepare an electrode film which even when prepared, is likely to peel from the current collector. It is noted that the average particle size is determined as a weight average diameter $D_{50}$ (particle diameter at 50% by weight cumulative, or median diameter) upon measurement of particle size distribution by laser light diffractometry.

Also preferably, the conductive silicon composite powder has a BET specific surface area of 0.5 to 20 $m^2/g$, especially 1 to 10 $m^2/g$. Particles with a surface area of less than 0.5 $m^2/g$ have a lower surface activity so that the binder used in the electrode preparation bonds thereto at a lower bonding power, eventually inviting a lowering of cycle performance after repeated charge/discharge cycles. On the other hand, particles with a surface area of more than 20 $m^2/g$ may absorb a large amount of solvent during the electrode preparation, which requires to add a large amount of the binder to maintain a bonding power. This eventually detracts from conductivity and cycle performance. It is noted that the BET specific surface area is a surface area measured by the BET single-point method as a quantity of $N_2$ gas adsorbed.

Preferably, the amount of carbon coated or deposited on the conductive silicon composite powder is at least 3%, more preferably at least 5%, most preferably at least 10% by weight and up to 70%, more preferably up to 50%, even more preferably up to 40%, most preferably up to 30% by weight based on the weight of the conductive silicon composite powder, that is, silicon composite powder whose particle surfaces are covered with conductive coatings by chemical vapor deposition. With too small a carbon coverage, the silicon composite is improved in conductivity, but may provide unsatisfactory cycle performance when assembled in a lithium ion secondary cell. Too large a carbon coverage indicates a too high carbon content which may reduce the negative electrode capacity, and may also lead to too low a bulk density and hence, a lowering of charge/discharge capacity per unit volume.

It is desired that the conductive silicon composite powder have an electrical conductivity of at least $1\times10^{-6}$ S/m, especially at least $1\times10^{-4}$ S/m. With an electrical conductivity of less than $1\times10^{-6}$ S/m, the electrode is less conductive and may provide degraded cycle performance when used as the negative electrode in a lithium ion secondary cell. As used herein, the "electrical conductivity" is determined by filling a four-terminal cylindrical cell with a powder to be tested, conducting current flow through the powder, and measuring the voltage drop thereacross.

Now, it is described how to prepare the conductive silicon composite of the invention.

Any desired method may be used in preparing the conductive silicon composite of the invention as long as particles of the structure having silicon crystallites dispersed in a silicon compound are coated on their surfaces with carbon and preferably have an average particle size of about 0.01 to 30 µm. For example, methods I to III described below are preferably employed.

Method I involves the steps of using silicon oxide powder having the general formula: SiOx wherein $1 \leq x < 1.6$ as a starting material, heat treating it in an atmosphere containing an organic gas and/or vapor at a temperature of 900 to 1,400° C., preferably 1,000 to 1,400° C., more preferably 1,050 to 1,300° C., most preferably 1,100 to 1,200° C., for causing disproportionation of the silicon oxide powder as the starting material into a composite of silicon and silicon dioxide, and simultaneously effecting chemical vapor deposition on its surface.

Method II involves the step of heat treating a component in an atmosphere containing an organic gas and/or vapor at a temperature of 800 to 1,400° C., preferably 900 to 1,300° C., more preferably 1,000 to 1,200° C., for effecting chemical vapor deposition on the surface; the component being selected from among (a) a silicon composite obtained by previously heat treating silicon oxide powder having the general formula: SiOx wherein $1 \leq x < 1.6$ in an inert gas atmosphere at a temperature of 900 to 1,400° C., preferably 1,000 to 1,400° C., more preferably 1,100 to 1,300° C. for disproportionation, (b) a composite obtained by coating silicon microparticulates with silicon dioxide by the sol-gel method, (c) a composite obtained by coagulating silicon fine powder with the aid of finely divided silica (such as fumed silica or precipitated silica) and water and sintering, and (d) a product obtained by heating silicon and partial oxide or nitride thereof, preferably ground to a particle size of 0.1 to 50 µm, in an inert gas stream at a temperature of 800 to 1,400° C.

Method III involves the steps of previously subjecting silicon oxide powder having the general formula: SiOx wherein $1 \leq x < 1.6$ to chemical vapor deposition with an organic gas and/or vapor at a temperature of 500 to 1,200° C., preferably 500 to 1,000° C., more preferably 500 to 900° C., and heat treating the resulting product in an inert gas atmosphere at 900 to 1,400° C., preferably 1,000 to 1,400° C., more preferably 1,100 to 1,300° C. for disproportionation.

The silicon oxide (powder or particles) as used herein is intended to encompass amorphous silicon oxides which are obtained by heating a mixture of silicon dioxide and metallic silicon to produce silicon monoxide gas and cooling the silicon monoxide gas for precipitation. The silicon oxide powder used herein is represented by the general formula: SiOx wherein $1.0 \leq x < 1.6$, preferably $1.0 \leq x \leq 1.3$, more preferably $1.0 \leq x \leq 1.2$, and takes the form of particles having an average particle size of preferably at least 0.01 µm, more preferably at least 0.1 µm, even more preferably 0.5 µm, and preferably up to 30 µm, more preferably up to 20 µm, and a BET specific surface area of preferably at least 0.1 $m^2/g$, more preferably at least 0.2 $m^2/g$, and preferably up to 30 $m^2/g$, more preferably up to 20 $m^2/g$. If the average particle size and surface area of the starting silicon oxide powder are outside the above ranges, a conductive silicon composite powder having the desired average particle size and surface area cannot be obtained. Preparation of SiOx powder wherein x is less than 1.0 is difficult. When SiOx powder wherein x is equal to or more than 1.6 is subjected to CVD treatment, the resulting conductive silicon composite powder contains a large proportion of inactive $SiO_2$, which may result in a low charge/discharge capacity when assembled in a lithium ion secondary cell.

Method I or II involves chemical vapor deposition treatment at a temperature of 800 to 1,400° C., preferably 900 to 1,400° C., more preferably 1,000 to 1,400° C. (this treatment is also referred to as thermal CVD treatment). If the heat treatment temperature is below 800° C., the fusion of conductive carbon coating to silicon composite and the alignment or crystallization of carbon atoms may be insufficient. If the temperature is above 1,400° C., the structuring of silicon dioxide proper is promoted to such an extent as to impede motion of lithium ions, probably risking the function as a lithium ion secondary cell.

Method I or III involves disproportionation of silicon oxide. A heat treatment temperature below 900° C. may be inefficient because disproportionation does not take place at all or formation of minute cells or crystallites of silicon becomes time-consuming. If the temperature is above 1,400° C., the structuring of silicon dioxide proper is promoted to such an extent as to impede motion of lithium ions, probably risking the function as a lithium ion secondary cell.

In Method III, CVD treatment is followed by disproportionation of silicon oxide at 900 to 1,400° C., preferably 1,000 to 1,400° C. Even a treatment temperature for chemical vapor deposition (CVD) in the range below 800° C. is acceptable because the product is eventually obtained in which a conductive carbon coating having aligned or crystallized carbon atoms is fused to surfaces of silicon composite particles.

As understood from the above, a carbon film is formed preferably by effecting thermal CVD (i.e., chemical vapor deposition at 800° C. or higher), and the time of thermal CVD is determined appropriate as a function of carbon buildup. During the treatment, particles may sometimes agglomerate together, and if so, the agglomerates are disintegrated in a ball mill or the like. If necessary, thermal CVD is similarly conducted again.

In Method I, when silicon oxide having the general formula: SiOx wherein 1≦x<1.6 is used as the starting material, it is crucial to carry out disproportionation reaction simultaneously with chemical vapor deposition so that silicon having a crystal structure is finely dispersed in silicon dioxide. In this embodiment, the treatment temperature and time for chemical vapor deposition and disproportionation to proceed, the type of organic material to generate the organic gas, and the concentration of organic gas must be properly selected. The heat treatment time (CVD/disproportionation time) is usually 0.5 to 12 hours, preferably 1 to 8 hours, more preferably 2 to 6 hours, although the heat treatment time is related to the heat treatment temperature (CVD/disproportionation temperature) as well. For example, heat treatment is preferably carried out for at least 5 hours when the treatment temperature is 1,000° C.

In Method II, when heat treatment is carried out in an organic gas and/or vapor-containing atmosphere, the heat treatment time (CVD treatment time) may be usually 0.5 to 12 hours, preferably 1 to 6 hours. When silicon oxide SiOx is previously disproportionated, the heat treatment time (disproportionation time) is usually 0.5 to 6 hours, preferably 0.5 to 3 hours.

In Method III, when silicon oxide SiOx is previously chemical vapor deposition treated, the treatment time (CVD treatment time) may be usually 0.5 to 12 hours, preferably 1 to 6 hours. The time of heat treatment in an inert gas atmosphere (disproportionation time) may be usually 0.5 to 6 hours, preferably 0.5 to 3 hours.

In the practice of the invention, the organic material to generate the organic gas is selected from those materials capable of producing carbon (graphite) through pyrolysis at the heat treatment temperature, especially in a non-oxidizing atmosphere. Exemplary are aliphatic and alicyclic hydrocarbons such as methane, ethane, ethylene, acetylene, propane, butane, butene, pentane, isobutane, and hexane alone or in admixture of any, and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in admixture of any. Also, gas light oil, creosote oil and anthracene oil obtained from the tar distillation step are useful as well as naphtha cracked tar oil, alone or in admixture.

For the thermal CVD (thermal chemical vapor deposition) and/or the disproportionating treatment, any desired reactor having a heating mechanism may be used in a non-oxidizing atmosphere. Depending on a particular purpose, a reactor capable of either continuous or batchwise treatment may be selected from, for example, a fluidized bed reactor, rotary furnace, vertical moving bed reactor, tunnel furnace, batch furnace and rotary kiln. The treating gas used herein may be the aforementioned organic gas alone or in admixture with a non-oxidizing gas such as Ar, He, $H_2$ or $N_2$.

Among others, a rotary furnace, rotary kiln or similar reaction apparatus of the structure that a furnace cylinder rotates about a horizontal axis is preferred because silicon oxide particles are subjected to CVD treatment while being tumbled, so that consistent production is possible without causing silicon oxide particles to agglomerate together. The furnace cylinder is preferably rotated at 0.5 to 30 rpm, more preferably 1 to 10 rpm. It is noted that any desired reaction apparatus of the rotary structure may be used as long as it has a furnace cylinder capable of retaining an atmosphere, a rotary mechanism for rotating the furnace cylinder, and a heater for heating and holding the furnace cylinder at a desired temperature. Depending on a particular purpose, the reaction apparatus may be provided with a material feed mechanism (e.g., feeder) and a product recovery mechanism (e.g., hopper). The furnace cylinder may be inclined or provided with baffles for controlling the residence time of the charge. The material of the furnace cylinder is not critical. Any desired material may be selected from among, for example, ceramics such as silicon carbide, alumina, mullite and silicon nitride, high-melting metals such as molybdenum and tungsten, stainless steel and quartz, depending on treating conditions and purposes.

More efficiently the conductive carbon coating is formed when the linear velocity u (m/sec) of fluidizing gas is selected such that its ratio to the minimum fluidization velocity $u_{mf}$ is in the range $1.5 \leq u/u_{mf} \leq 5$. With $u/u_{mf} < 1.5$, insufficient fluidization may result in variant conductive coatings. With $u/u_{mf} > 5$, on the other hand, secondary agglomeration of particles may occur, failing to form uniform conductive coatings. It is noted that the minimum fluidization velocity $u_{mf}$ is dependent on the size of particles, treatment temperature, treatment atmosphere and the like. The minimum fluidization velocity $u_{mf}$ is defined, in a test of gradually increasing the linear velocity of fluidizing gas to a powder bed, as the linear velocity of fluidizing gas when the pressure loss across the powder is equal to W/A wherein W is the weight of the powder and A is the cross-sectional area of the fluidized bed. The minimum fluidization velocity $u_{mf}$ is usually 0.1 to 30 cm/sec, preferably 0.5 to 10 cm/sec. To achieve such a minimum fluidization velocity $u_{mf}$, the powder usually have a particle size of 0.5 to 100 μm, preferably 5 to 50 μm. A particle size of less than 0.5 μm has a risk of secondary agglomeration preventing surfaces of discrete particles from effective treatment.

According to the invention, the conductive silicon composite powder may be used as a negative electrode material, specifically a negative electrode active material to construct a non-aqueous electrolyte secondary cell having a high capacity and improved cycle performance, especially a lithium ion secondary cell.

The lithium ion secondary cell thus constructed is characterized by the use of the conductive silicon composite powder as the negative electrode active material while the materials of the positive electrode, negative electrode, electrolyte, and separator and the cell design are not critical. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyltetrahydrofuran, alone or in admixture. Use may also be made of other various non-aqueous electrolytes and solid electrolytes.

When a negative electrode is prepared using the inventive conductive silicon composite powder, a conductive agent such as graphite may be added to the powder. The type of conductive agent used herein is not critical as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

When the conductive silicon composite powder is mixed with the conductive agent, the amount of conductive agent is preferably 1 to 60% by weight, more preferably 10 to 50% by weight, even more preferably 20 to 50% by weight of the mixture. A mixture with less than 1% of the conductive agent may fail to withstand expansion and contraction on charge/discharge cycles, whereas a mixture with more than 60% of the conductive agent may have a reduced charge/discharge capacity. Also the mixture preferably have a total carbon content of 25 to 90% by weight, especially 30 to 50% by weight (the total of carbon coated or deposited on surfaces of conductive silicon composite particles plus carbon in conductive agent). A mixture with a total carbon content of less than 25% by weight may fail to withstand expansion and contraction on charge/discharge cycles, whereas a mixture with more than 90% of carbon may have a reduced charge/discharge capacity.

EXAMPLE

Examples of the invention are given below by way of illustration and not by way of limitation. In Examples, % is percent by weight, g is gram, and TEM is transmission electron microscopy.

Example 1

To demonstrate the structure of a conductive silicon composite according to the invention, reference is made to one exemplary conductive silicon composite derived from silicon oxide (SiOx) as a starting material.

Silicon oxide (SiOx, x=1.02) was milled in a ball mill using hexane as a dispersing medium. The silicon oxide powder thus obtained was placed in a rotary kiln type reactor where disproportionation of silicon oxide and thermal CVD were simultaneously carried out in a stream of methane-argon gas mixture at 1,150° C. and for an average residence time of about 2 hours. The powder thus obtained was analyzed by solid-state NMR, x-ray diffractometry, TEM photomicroscopy and Raman spectroscopy (excitation light 532 nm), with the results shown in FIGS. 1 to 4, respectively. As seen from the results of solid-state $^{29}$Si-NMR analysis on silicon oxide as the starting material and conductive silicon composite as the final product, in the curve of the conductive silicon composite which performs well as the lithium ion secondary cell negative electrode active material, a peak corresponding to a silicon assembly appears near −84 ppm, indicating that the structure is different from the structure of silicon oxide as the starting material in which silicon dioxide and silicon are utterly randomly distributed. Unlike the pattern of silicon oxide, the x-ray diffraction pattern by Cu—Kα ray of the conductive silicon composite contains a diffraction line attributable to Si(111) near 2θ=28.4°. The silicon crystals dispersed in silicon dioxide has a size of 11 nm as determined from the half width of the diffraction line by Scherrer method. This also demonstrates that a composite in which micro-crystals of silicon (Si) are dispersed in silicon dioxide ($SiO_2$) is appropriate. Further, it is confirmed from the TEM photomicrograph of a surface adjacent portion of the particle that carbon atoms are in laminar arrangement along the particle surface. A graphite structure is also confirmed from the Raman spectrum (FIG. 4). Owing to this structure, the powder has a high conductivity. Furthermore, the fusion of carbon to the substrate is observed at the inner side of the carbon layer. This restrains breakage of particles and a reduction of conductivity by occlusion and release of lithium ions and is tied with an improvement in cycle performance.

More particularly, FIG. 1 is a solid-state $^{29}$Si-NMR chart comparing a silicon oxide powder as a starting material and a conductive silicon composite obtained therefrom by thermal CVD (with methane gas). The chart of silicon oxide contains a broad peak attributable to zero-valent silicon centering near −72 ppm and a broad peak attributable to tetravalent silicon (silicon dioxide) centering near −114 ppm. In contrast, the chart of the conductive silicon composite contains a peak near −84 ppm which indicates that zero-valent silicon gathers to form silicon-to-silicon bonds.

Figure 2B:
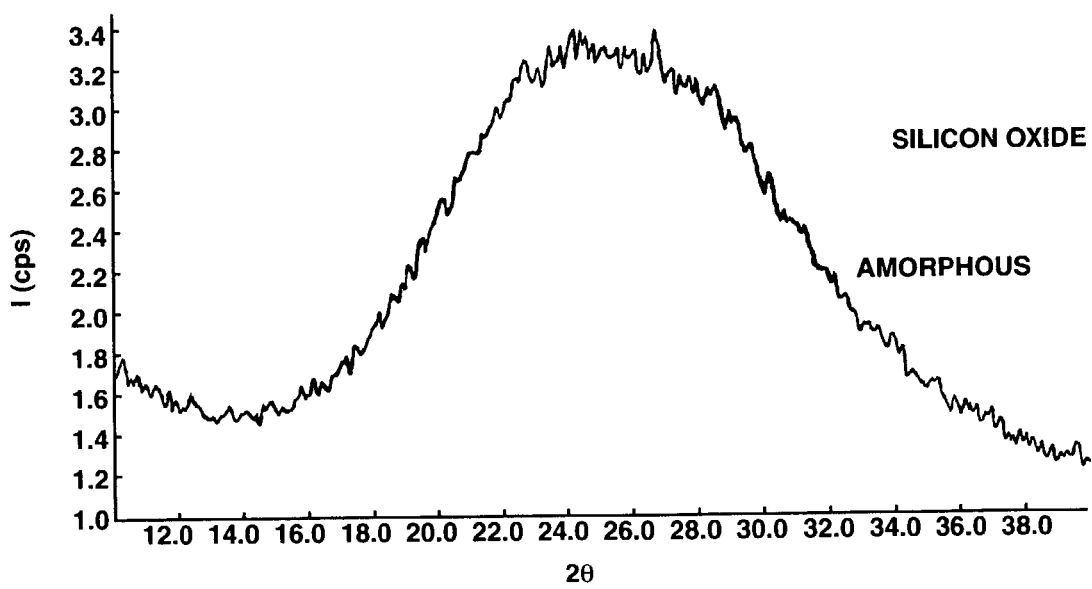

FIG. 2 is a x-ray diffraction (Cu—Kα) chart comparing a silicon oxide powder as a starting material and a conductive silicon composite obtained therefrom by thermal CVD (with methane gas). The chart of silicon oxide contains only a broad peak near 2θ=24° indicating a homogeneous and amorphous state. In contrast, the chart of the conductive silicon composite contains a peak near 2θ=28.4° which is attributable to Si(111) of crystalline silicon (diamond structure). The silicon crystals dispersed in silicon dioxide has a size of about 11 nm as determined from the half width of the peak by Scherrer method.

Figure 3B:
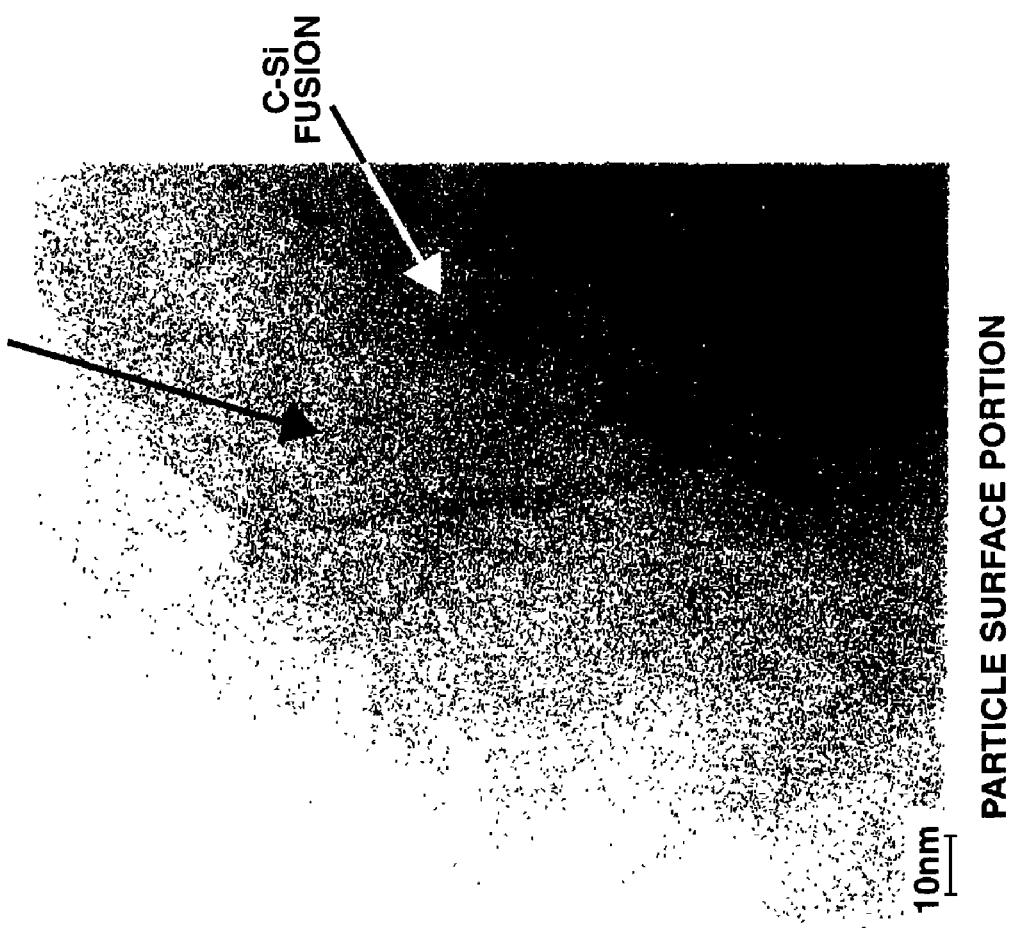
FIG. 3 is a TEM photomicrograph of a conductive silicon composite particle, FIG. 3A showing an outer appearance and FIG. 3B showing a particle surface portion.
Figure 3A:

FIGS. 3A and 3B are TEM photomicrographs of a conductive silicon composite particle and a surface portion thereof. It is seen that in the outermost shell, carbon atoms are aligned in laminar arrangement. FIG. 4 is a Raman spectrum of the conductive silicon composite. Peaks near 1580 cm$^{-1}$ indicate that part or all of carbon has a graphite structure. The peak near 1330 cm$^{-1}$ lowers as crystallinity promotes.

Figure 5B:
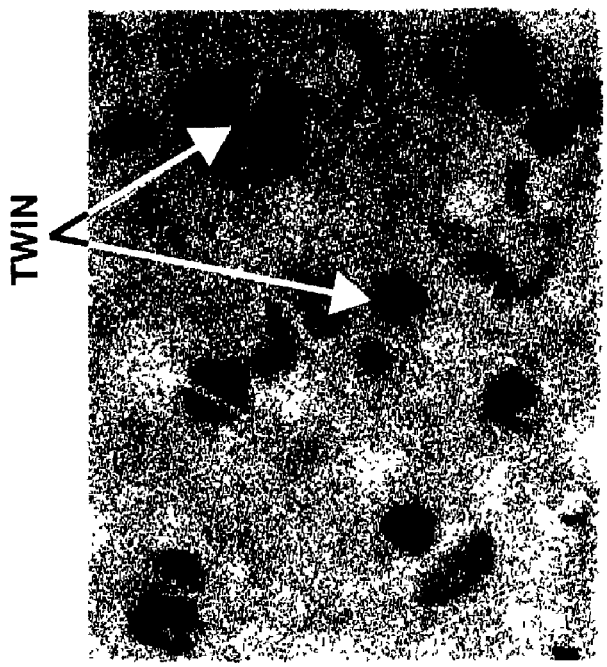
FIG. 5B is an enlarged photomicrograph of a portion thereof.
Figure 5A:
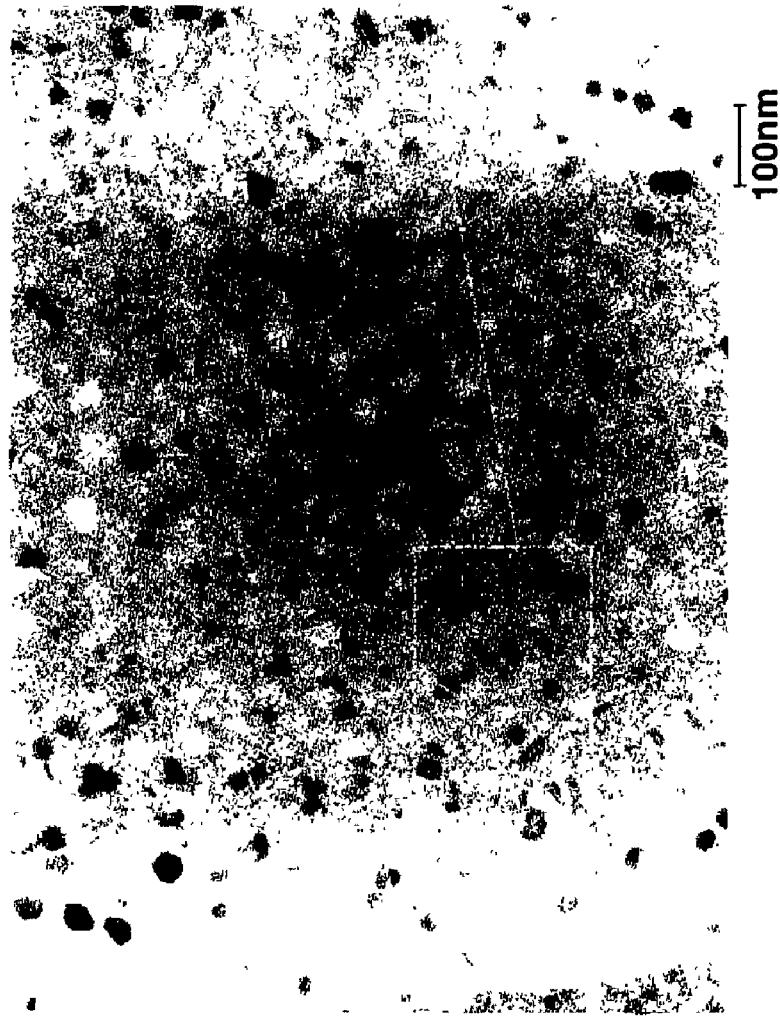
FIG. 5A is a TEM photomicrograph of the interior of a conductive silicon composite particle.

Separately, a mass of silicon oxide (SiOx, x=1.02) was placed in a vertical reactor where it was heated to 1,200° C. in an argon stream. Thermal CVD was carried out by heating at the temperature for 2 hours while flowing a gas mixture of 50 vol % methane and argon. The thus obtained conductive silicon composite is FIB processed into a slice. FIG. 5 is a TEM photomicrograph of this slice, indicating that silicon is dispersed as crystallites. Those grains of regular shape which look black or white in the photograph are silicon crystallites. They look white or black because electron transmission differs with the direction of crystals. Some black-looking grains are twins.

Example 2

Silicon oxide (SiOx, x=1.02) was milled in a ball mill using hexane as a dispersing medium. By filtering the suspension thus obtained and removing the solvent in a nitrogen atmosphere, a powder having an average particle size of about 0.8 μm was obtained. The silicon oxide powder was placed in a rotary kiln type reactor where disproportionation of silicon oxide and thermal CVD were simultaneously carried out in a stream of methane-argon gas mixture at 1,150° C. and for an average residence time of about 2 hours. The product thus obtained had a carbon content of 16.5% and the amount of active silicon or zero-valent silicon was 26.7% as determined from a quantity of hydrogen generated upon reaction with an aqueous potassium hydroxide solution. On analysis by X-ray diffractometry (Cu—Kα), the silicon crystals dispersed in silicon dioxide had a size of about 11 nm as determined by Scherrer method from the half width of the diffraction line at 2θ=28.4° attributable to Si(111). At the end of thermal CVD, the conductive silicon composite was disintegrated in an automated mortar, yielding a powder having an average particle size of about 2.8 μm. This powder was subjected to electrolytic evaluation by the following test method. The results are shown in Table 1.

Cell Test

The evaluation of a conductive silicon composite as the negative electrode active material for a lithium ion secondary cell was carried out by the following procedure which was common to all Examples and Comparative Examples. A negative electrode material mixture was obtained by adding synthetic graphite (average particle diameter D$_{50}$=5 μm) to the conductive silicon composite obtained above so as to give a total carbon content of 40% (carbon of synthetic graphite plus carbon deposited on conductive silicon composite). To the mixture, polyvinylidene fluoride was added in an amount of 10% of the resulting mixture. N-methylpyrrolidone was then added thereto to form a slurry. The slurry was coated onto a copper foil of 20 μm gage and dried at 120° C. for one hour. Using a roller press, the coated foil was shaped under pressure into an electrode sheet, of which 2 cm$^2$ discs were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 3 mA until the voltage of the test cell reached 0 V, and after reaching 0 V, continued with a reduced current flow so that the cell voltage was kept at 0 V, and terminated when the current flow decreased below 100 μA. Discharging was conducted with a constant current flow of 3 mA and terminated when the cell voltage rose above 2.0 V, from which a discharge capacity was determined.

By repeating the above operations, the charge/discharge test on the lithium ion secondary cell was carried out 30 and 50 cycles. The test results are shown in Table 1.

Example 3

Silicon oxide in block or flake form was heated in an inert gas (argon) atmosphere at 1,300° C. for one hour to effect disproportionation into silicon and silicon dioxide. On analysis by X-ray diffractometry (Cu—Kα), the silicon crystals in the product had a size of about 55 nm as determined by Scherrer method from the half width of the diffraction line at 2θ=28.4° attributable to Si(111). The silicon-silicon dioxide composite as heat treated was then milled in a ball mill using hexane as a dispersing medium. By filtering the suspension thus obtained and removing the solvent in a nitrogen atmosphere, a powder having an average particle size of about 0.8 μm was obtained. The silicon composite powder was placed in a vertical tubular furnace (inner diameter ~50 mm) where thermal CVD was carried out in a stream of methane-argon gas mixture at 1,100° C. and for 3 hours. The conductive silicon composite powder thus obtained was disintegrated in an automated mortar. The conductive silicon composite powder thus obtained had a carbon content of 11.3%, an active silicon content of 28.1%, and an average particle size of 8.6 μm. The silicon crystals dispersed in silicon dioxide had a size of about 60 nm as determined by Scherrer method.

This conductive silicon composite powder was evaluated as the negative electrode active material for a lithium ion secondary cell as in Example 2. The results are also shown in Table 1.

Example 4

The silicon oxide powder used in Example 2 was placed in a vertical tubular furnace (inner diameter ~50 mm) where thermal CVD was carried out in a stream of acetylene-argon gas mixture at 800° C. and for 1 hour. The powder was then placed in a rotary kiln set at about 1,200° C. where heat treatment was carried out in an inert gas stream for an average residence time of about 1 hour for disproportionation. The conductive silicon composite powder thus obtained had a carbon content of 17.5%, an active silicon content of 25.4% and an average particle size of 3.1 μm. The silicon crystals dispersed in silicon dioxide had a size of about 20 nm as determined by X-ray diffractometry and Scherrer method.

The conductive silicon composite having the above physical properties was evaluated as the negative electrode active material for a lithium ion secondary cell as in Example 2. The results are also shown in Table 1.

Example 5

A metallic silicon powder of industrial grade (Sirgrain Powder, 10 μm, by Elkem) was milled in a ball mill DYNO-MILL Type KDL-Pilot A by Willy A Bachofen AG using zirconia beads of 0.1 mm and hexane as a dispersing medium. The silicon fine powder (average particle size ~90 nm) thus obtained, 100 g, was mixed with 200 g of fumed silica (Aerosil 200 by Nippon Aerosil Co., Ltd.) and kneaded with an amount of water into a paste. The paste was dried at 150° C. into a solid, which was fired in a nitrogen atmosphere at 1,000° C. for 3 hours. After cooling, the sintered product was ground in a ball mill using hexane as a dispersing medium until an average particle size of 8 μm was reached. The silicon-silicon dioxide composite powder thus obtained was placed in a rotary kiln type reactor where thermal CVD was carried out in a stream of methane-argon gas mixture at 1,150° C. and for an average residence time of about 2 hours. The product thus obtained had a carbon content of 18.5% and the amount of active silicon or zero-valent silicon was 29.7% as determined from a quantity of hydrogen generated upon reaction with an aqueous potassium hydroxide solution. At the end of thermal CVD, the conductive silicon composite was disintegrated in an automated mortar, yielding a powder having an average particle size of about 9.2 μm.

This silicon composite was evaluated as the negative electrode active material for a lithium ion secondary cell as in Example 2. The results are also shown in Table 1.

Comparative Example 1

The powder (silicon-silicon dioxide composite) which was the product of disproportionation of silicon oxide into silicon and silicon dioxide, obtained in Example 3, but without thermal CVD treatment, was evaluated as the negative electrode active material for a lithium ion secondary cell as in Example 2. The results are also shown in Table 1.

Comparative Example 2

The silicon oxide powder obtained in Example 2 was placed as a starting material in a vertical tubular furnace (inner diameter ~50 mm) where thermal CVD was carried out in a stream of acetylene-argon gas mixture at 800° C. and for 1 hour. The carbon CVD treated powder of silicon oxide had a carbon content of 18.5%, an active silicon content of 25.4%, and an average particle size of 2.1 μm. On x-ray diffraction analysis, the pattern was the same as the silicon oxide or starting material, indicating that disproportionation had not occurred. The silicon composite having the above physical properties was evaluated as the negative electrode active material for a lithium ion secondary cell as in Example 2. The results are also shown in Table 1. This product was identified by x-ray diffraction analysis to be an amorphous silicon oxide (SiOx) powder having carbon coated thereon, and was poor in both cycle performance and initial efficiency.

Comparative Example 3

A conductive silicon composite was prepared as in Example 5 except that a metallic silicon powder having an average particle size of 1 μm was used instead of the metallic silicon powder having an average particle size of about 90 nm. On analysis, the carbon CVD treated powder of silicon-silicon dioxide composite had a carbon content of 17.8%, an active silicon content of 28.5%, and an average particle size of 9.5 μm. The carbon-coated silicon-silicon dioxide composite having the above composition was evaluated as the negative electrode active material for a lithium ion secondary cell as in Example 2. The results are also shown in Table 1.

Comparative Example 4

The silicon fine powder having an average particle size of 90 nm obtained in Example 5 and spherical silica having an average particle size of 8.0 μm were simply mixed in a weight ratio of about 1:2. The mixture was CVD treated under the same conditions as described in Example 2, obtaining a composite having a carbon content of 14.0% and an active silicon content of 34.0%. This composite was evaluated as the negative electrode active material for a lithium ion secondary cell as in Example 2. The cycle performance was extremely low.

TABLE 1

|  | Example | | | | Comparative Example | | | |
| --- | --- | --- | --- | --- | --- | --- | --- | --- |
|  | 2 | 3 | 4 | 5 | 1 | 2 | 3 | 4 |
| Active silicon content (wt %) | 26.7 | 28.1 | 25.4 | 29.7 | 24.9 | 25.4 | 28.5 | 34.0 |
| Deposited carbon (wt %) | 16.5 | 11.3 | 17.5 | 18.5 | nil | 18.5 | 17.8 | 14.0 |
| Initial charge capacity (mAh/g) | 1060 | 986 | 918 | 1043 | 955 | 1021 | 1200 | 1172 |
| Initial discharge capacity (mAh/g) | 756 | 700 | 656 | 743 | 630 | 730 | 800 | 738 |
| Capacity retentivity after 30 cycles (%) | 99 | 95 | 95 | 82 | 45 | 78 | 21 | UM |
| Capacity retentivity after 50 cycles (%) | 98 | 90 | 89 | 70 | 5 | 55 | 3 | UM |

UM: unmeasurable

Comparative Example 5

Fumed silica (Aerosil 200 by Nippon Aerosil Co., Ltd.) used in Example 5, 200 g, was placed in a rotary kiln type reactor where thermal CVD was carried out in a stream of methane-argon gas mixture at 1,150° C. and for an average residence time of 2 hours. The CVD treated product was a black powder having a carbon content of 12%, an active silicon content of 0%, and an average particle size of 3.6 μm.

This CVD treated powder was evaluated as the negative electrode active material for a lithium ion secondary cell as in Example 2. The results are shown in Table 2.

TABLE 2

|  | CVD treated SiO$_2$ |
| --- | --- |
| Active silicon content (wt %) | 0 |
| Deposited carbon (wt %) | 12.0 |
| Initial charge capacity (mAh/g) | 160 |
| Initial discharge capacity (mAh/g) | 135 |
| Capacity retentivity after 30 cycles (%) | 97.0 |
| Capacity retentivity after 50 cycles (%) | 95.6 |

The charge/discharge capacity obtained correspond to only the contribution of added graphite conductive agent and deposited carbon, indicating that SiO$_2$ is a substantially inactive material.

For comparison purposes, a reference cell was constructed as in Example 2 except that only graphite was used as the negative electrode active material. This cell showed an initial charge capacity of 400 mAh/g and an initial discharge capacity of 340 mAh/g. In the above test, the negative electrode mixture had a total carbon content of 40% by weight, and the initial charge/discharge capacity of Comparative Example 5 corresponds to 40% of the initial charge/discharge capacity of the reference cell using only graphite. It is then evident that in Comparative Example 5, only the carbon coated or deposited by CVD and the graphite added perform for charge/discharge operation.

Example 6

Figure 6:
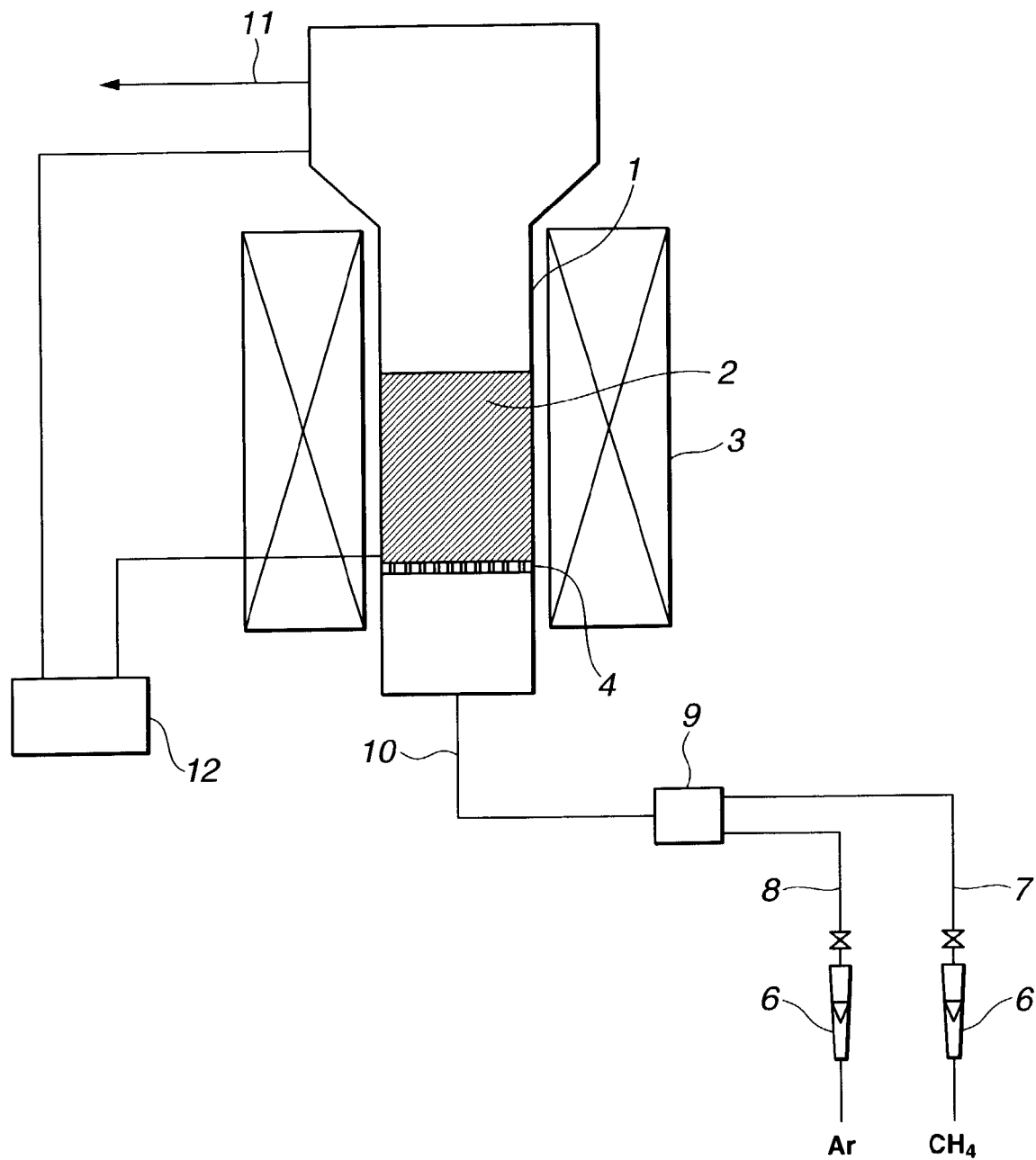
FIG. 6 schematically illustrates a batchwise fluidized bed reactor system used in Example 6.

A conductive silicon composite powder was prepared using a batchwise fluidized bed reactor system as shown in FIG. 6.

The system of FIG. 6 includes a fluidized bed reactor 1 having a gas distributor 4 on which a fluidized bed 2 is formed, a heater 3 surrounding the reactor, and a gas feed line 10 having a gas blender 9. An organic gas or vapor and an inert gas are fed from lines 7 and 8, metered by flow meters 6, and mixed in the gas blender 9, from which the gas mixture is fed to the reactor 1 through the feed line 10 and injected into the reactor chamber through a plurality of orifice ports in the gas distributor 4. With a silicon oxide powder admitted into the reactor chamber, the gas injection forms a fluidized bed 2 of silicon oxide powder. The reactor 1 is provided with a gas discharge line 11 and a differential pressure gauge 12.

A silicon oxide powder SiOx (x=1.05) having an average particle size of 1.0 μm and a BET specific surface area of 6 m$^2$/g was admitted into the fluidized bed chamber (inner diameter 80 mm) of the fluidized bed reactor. While Ar gas was fed at a rate of 2.0 NL/min through the flow meter 6, the heater 3 was actuated to heat the chamber at a rate of 300° C./hr to a temperature of 1,100° C. and hold the chamber at the temperature. After 1,100° C. was reached, CH$_4$ gas was additionally fed at a rate of 1.0 NL/min whereupon CVD treatment was carried out for 3 hours. At the end of operation, the reactor was cooled and a black powder was recovered. The black powder was ground by an automated mortar for one hour, obtaining a conductive silicon composite powder. The conductive silicon composite powder had an average particle size of 2.5 μm, a BET specific surface area of 9 m$^2$/g, a carbon coverage of 25% by weight, a silicon crystallite size of 30 nm as determined by Scherrer method, and an active or zero-valent silicon amount of 28.0% by weight as determined from a quantity of hydrogen generated upon reaction with an aqueous potassium hydroxide solution.

Cell Test

A lithium ion secondary cell was constructed as in Example 2. The cell was allowed to stand overnight at room temperature. Using a secondary cell charge/discharge tester (Nagano K.K.), a charge/discharge test was carried out on the cell. Charging was conducted with a constant current flow of 1 mA until the voltage of the test cell reached 0 V, and after reaching 0 V, continued with a reduced current flow so that the cell voltage was kept at 0 V, and terminated when the current flow decreased below 20 μA. Discharging was conducted with a constant current flow of 1 mA and terminated when the cell voltage rose above 1.8 V, from which a discharge capacity was determined.

By repeating the above operations, the charge/discharge test on the lithium ion secondary cell was carried out 50 cycles. The cell had as high a capacity as demonstrated by a first cycle discharge capacity of 1493 mAh/cm$^3$, a 50th cycle discharge capacity of 1470 mAh/cm$^3$, and a cycle retentivity after 50 cycles of 98.5%. It was a lithium ion secondary cell having an improved initial charge/discharge efficiency and cycle performance.

Examples 7–9

Conductive silicon composite powders were prepared as in Example 6 except that the average particle size and BET surface area of starting silicon oxide powder and the treating conditions were changed as shown in Table 3. Table 3 also reports the average particle size, BET surface area, carbon coverage, silicon crystallite size and zero-valent silicon content of the thus prepared silicon composite powders.

Using these conductive silicon composite powders, lithium ion secondary cells for evaluation purpose were constructed as in Example 2. A charge/discharge test was carried out as in Example 6. The test results are shown in Table 4.

TABLE 3

|  | Starting silicon oxide (SiOx) physical properties | | | CVD treating conditions | | Conductive silicon composite powder | | | | |
| --- | --- | --- | --- | --- | --- | --- | --- | --- | --- | --- |
|  | Average particle size (μm) | BET surface area (m$^2$/g) | x value in SiOx | Treating temperature (° C.) | Treating time (hr) | Average particle size (μm) | BET surface area (m$^2$/g) | Carbon coverage (wt %) | Crystallite size (nm) | Zero-valent silicon content (%) |
| Example 6 | 1.0 | 6 | 1.05 | 1100 | 3 | 2.5 | 9.0 | 25 | 30 | 28 |
| Example 7 | 10 | 4 | 1.02 | 1100 | 3 | 15 | 3.5 | 18 | 120 | 25 |

TABLE 3-continued

| | Starting silicon oxide (SiOx) physical properties | | | CVD treating conditions | | Conductive silicon composite powder | | | | |
|---|---|---|---|---|---|---|---|---|---|---|
| | Average particle size (µm) | BET surface area (m²/g) | x value in SiOx | Treating temperature (° C.) | Treating time (hr) | Average particle size (µm) | BET surface area (m²/g) | Carbon coverage (wt %) | Crystallite size (nm) | Zero-valent silicon content (%) |
| Example 8 | 0.5 | 19 | 1.15 | 1100 | 3 | 0.8 | 18.2 | 35 | 20 | 30 |
| Example 9 | 1.0 | 6 | 1.05 | 1300 | 1 | 3.7 | 7.0 | 22 | 100 | 26 |

TABLE 4

| | Initial discharge capacity (mAh/cm³) | 50th cycle discharge capacity (mAh/cm³) | Capacity retention after 50 cycles (%) |
|---|---|---|---|
| Example 6 | 1493 | 1470 | 98.5 |
| Example 7 | 1600 | 1490 | 93.1 |
| Example 8 | 1362 | 1335 | 98.0 |
| Example 9 | 1490 | 1465 | 98.3 |

Example 10

Figure 7:
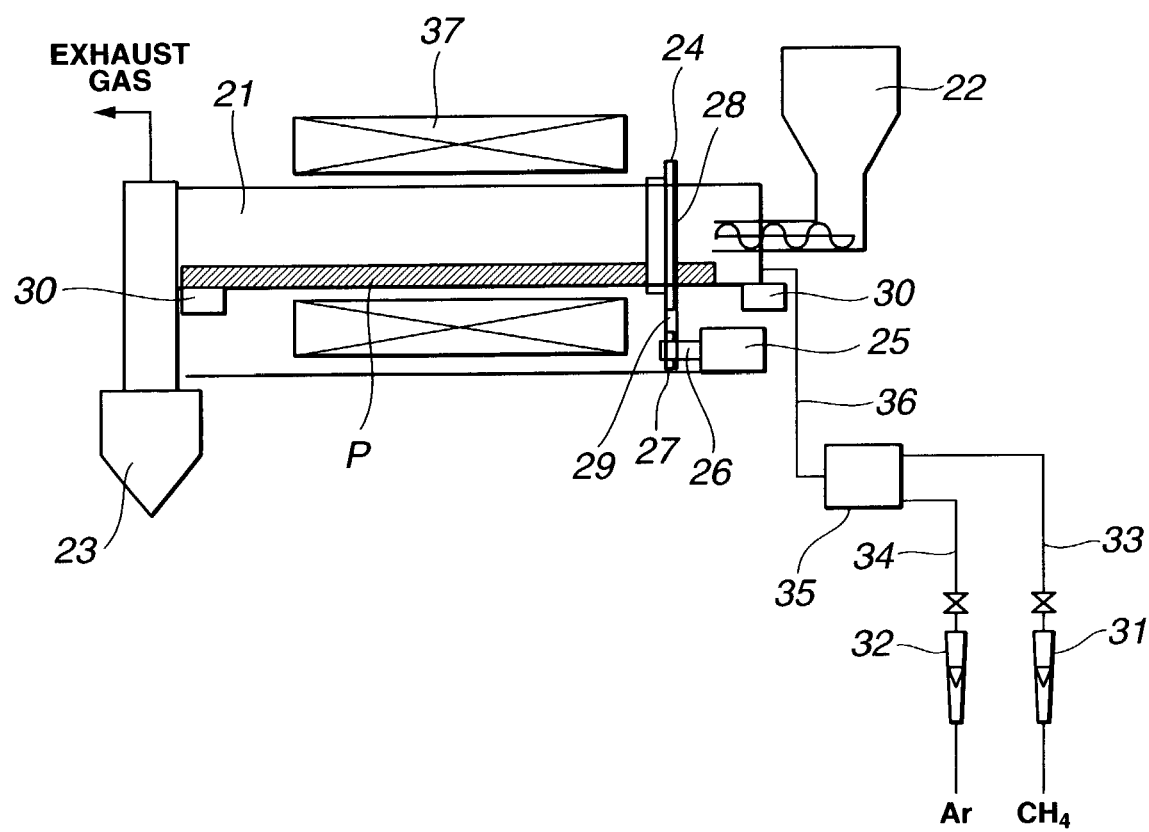
FIG. 7 schematically illustrates a rotary furnace used in Example 10.

A conductive silicon composite powder was prepared using a rotary furnace as shown in FIG. 7.

FIG. 7 illustrates one exemplary rotary furnace which is preferred in the practice of the invention. The system includes a furnace cylinder 21 for receiving a charge or silicon oxide powder P, which is inclined at an angle of 0 to 10°, especially 0.1 to 5° relative to the horizontal. The furnace cylinder 21 is coupled to a feeder 22 at an inlet side and a recovery hopper 23 at an outlet side. When inclined, the furnace cylinder 21 is inclined downward from the inlet side to the outlet side. The system further includes a mechanism 24 for rotating the furnace cylinder 21 in cooperation with a motor 25. In the illustrated embodiment, the rotating mechanism 24 includes the motor 25, a pulley 27 attached to a rotating shaft 26 of the motor 25, a pulley 28 attached to the furnace cylinder 21, and a belt 29 trained therebetween, but is not limited thereto. The furnace cylinder 21 is rotatably supported on rollers 30, 30. Then the rotating mechanism 24 operates to rotate the furnace cylinder 21 about its axis at a predetermined speed.

Further included in the system are an organic gas or vapor inlet line 33, an inert gas inlet line 34, flow meters 31 and 32 in the lines 33 and 34, and a gas blender 35 to which the lines 33 and 34 are connected. The gases are mixed in the gas blender 35, whereupon the gas mixture is fed through a feed line 36 and introduced into the furnace cylinder 21 through an inlet port. A heater 37 is disposed outside the furnace cylinder 21.

The feeder 22 was charged with a silicon oxide powder SiOx (x=1.05) having an average particle size of 2.5 µm and a BET specific surface area of 10 m²/g. While Ar gas was fed at a rate of 3.0 NL/min through the flow meter 32, the heater 37 was actuated to heat the furnace cylinder 21 made of silicon carbide (inner diameter 80 mm) at a rate of 300° C./hr to a temperature of 1,200° C. and hold the cylinder at the temperature. After 1,200° C. was reached, the furnace cylinder 21 was inclined at an angel of 2° and at the same time, the motor 5 was actuated to rotating the cylinder 21 at 2 rpm. Then CH₄ gas was additionally fed at a rate of 2.0 NL/min through the flow meter 31, and the silicon oxide powder fed into the furnace cylinder 21 at a rate of 300 g/hr whereby CVD treatment was carried out. CVD treatment was continued for 10 hours. The process proceeded in a stable manner without raising any particular problem. At the end of operation, a black powder was recovered in a total amount of about 4 kg.

The black powder was ground by an automated mortar for one hour, obtaining a conductive silicon composite powder. The conductive silicon composite powder had an average particle size of 3.2 µm, a BET specific surface area of 9.8 m²/g, and a carbon coverage of 18% by weight, with a peak of crystalline Si being observed on x-ray diffractometry.

Using this powder, a lithium ion secondary cell was constructed. A charge/discharge test was carried out as in Example 6. The cell had as high a capacity as demonstrated by a first cycle discharge capacity of 1420 mAh/cm³, a 50th cycle discharge capacity of 1400 mAh/cm³, and a cycle retentivity after 50 cycles of 98.6%. It was a lithium ion secondary cell having an improved initial charge/discharge efficiency and cycle performance.

The conductive silicon composite of the invention affords satisfactory cycle performance when used as the negative electrode material in a non-aqueous electrolyte secondary cell.

Japanese Patent Application No. 2002-142777 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A conductive silicon composite in which particles of the structure that crystallites of silicon having a size of 1 to 500 nm are dispersed in silicon dioxide are coated on their surfaces with carbon.

2. The conductive silicon composite of claim 1 wherein the particles of the structure that crystallites of silicon are dispersed in silicon dioxide have an average particle size of 0.01 to 30 µm, a BET specific surface area of 0.5 to 20 m²/g, and a carbon coverage of 3 to 70% by weight.

3. The conductive silicon composite of claim 1 wherein the particle surfaces are at least partially fused to carbon.

4. The conductive silicon composite of claim 1 wherein when analyzed by x-ray diffractometry, a diffraction peak attributable to Si(111) is observed, and the silicon crystallites have a size of 1 to 500 nm as determined from the half width of the diffraction peak by Scherrer method, and the carbon coverage is 5 to 70% by weight of the silicon composite.

5. The conductive silicon composite of claim 1 which contains 1 to 35% by weight of zero-valent silicon capable of generating hydrogen gas upon reaction with an alkali hydroxide solution.

6. The conductive silicon composite of claim 1 wherein on Raman spectroscopy, the Raman shift provides a graphite structure-intrinsic spectrum near 1580 $cm^{-1}$.

7. A method for preparing the conductive silicon composite of claim 1, comprising the steps of disproportionating silicon oxide with an organic gas and/or vapor at a temperature of 900 to 1,400° C. and simultaneously effecting chemical vapor deposition.

8. A method for preparing the conductive silicon composite according to claim 7 wherein the silicon oxide represented by the general formula: SiOx wherein $1 \leq x < 1.6$ is in the form of particles having an average particle size of 0.01 to 30 μm and a BET specific surface area of 0.1 to 30 $m^2/g$.

9. A method for preparing the conductive silicon composite according to claim 7 wherein the method is conducted in a reactor selected from a fluidized bed reactor, rotary furnace, vertical moving bed reactor, tunnel furnace, batch furnace and rotary kiln.

10. A method for preparing the conductive silicon composite of claim 1, comprising the step of effecting chemical vapor deposition of a component with an organic gas and/or vapor at a temperature of 800 to 1,400° C., the component being selected from among a silicon composite obtained by previously heat treating silicon oxide in an inert gas atmosphere at 900 to 1,400° C. for disproportionation, a composite obtained by coating silicon microparticulates with silicon dioxide by the sol-gel method, a composite obtained by coagulating silicon fine powder with the aid of finely divided silica and water and sintering, and a product obtained by heating silicon and partial oxide or nitride thereof in an inert gas stream at 800 to 1,400° C.

11. A negative electrode material for a non-aqueous electrolyte secondary cell, comprising the conductive silicon composite of claim 1.

12. A negative electrode material for a non-aqueous electrolyte secondary cell, comprising a mixture of the conductive silicon composite of claim 1 and 1 to 60% by weight of a conductive agent, the mixture having a total carbon content of 25 to 90% by weight.

13. The conductive silicon composite of claim 1 wherein the particles have an average particle size of 0.01 to 30 μm.

14. The conductive silicon composite of claim 1 wherein the particles have a BET specific surface area of 0.1 to 30 $m^2/g$.

15. The conductive silicon composite of claim 1 wherein the particles have a BET specific surface area of 1 to 10 $m^2/g$.

16. The conductive silicon composite of claim 1 having an electrical conductivity of at least $1 \times 10^{-6}$ S/m.

17. The conductive silicon composite of claim 1 having an electrical conductivity of at least $1 \times 10^{-4}$ S/m.

18. A method for preparing a conductive silicon composite in which particles of the structure that crystallites of silicon are dispersed in a silicon compound are coated on their surfaces with carbon comprising the steps of previously subjecting silicon oxide to chemical vapor deposition with an organic gas and/or vapor at a temperature of 500 to 1,200° C. and heat treating the resulting product in an inert gas atmosphere at 900 to 1,400° C. for disproportionation.

* * * * *